United States Patent

Cox et al.

[11] Patent Number: 5,148,347
[45] Date of Patent: Sep. 15, 1992

[54] POLYMER-ENCASED ELECTRICAL CAPACITOR WITH PRESSURE SENSITIVE CIRCUIT INTERRUPTER

[75] Inventors: Michael E. Cox, Seekonk, Mass.; Corrado Albertazzi, Bologna, Italy; Heinz H. Findeisen, Milford; Russell E. Minkwitz, Jr., Walpole, both of Mass.

[73] Assignee: Aerovox Incorporated, New Bedford, Mass.

[21] Appl. No.: 520,874

[22] Filed: May 9, 1990

[51] Int. Cl.$^5$ .............................................. H01G 1/06
[52] U.S. Cl. ..................................... 361/272; 361/275; 29/25.42
[58] Field of Search ................... 361/275, 272, 534; 29/25.42

[56] References Cited

U.S. PATENT DOCUMENTS

| | | | |
|---|---|---|---|
| 3,553,542 | 1/1971 | Netherwood | 361/272 |
| 4,059,848 | 11/1977 | Koel et al. | 361/272 |
| 4,342,070 | 7/1982 | Evans | 361/272 X |
| 4,486,809 | 12/1984 | Deak et al. | 361/272 |
| 4,661,876 | 4/1987 | Strange et al. | 361/272 X |

Primary Examiner—L. T. Hix
Assistant Examiner—Khanh Dang
Attorney, Agent, or Firm—Fish & Richardson

[57] ABSTRACT

A polymer-encased capacitor with a nicked-wire interruption system has a capacitor element assembled onto a longitudinally-telescoping support member and installed in a polymer case so that one longitudinal end of the assembly rests on a surface of the case and the other longitudinal end is adjacent a retainer disk spaced at a predetermined longitudinal dimension between a point on the case and the cover of the case. A nicked-wire is attached to the capacitor element, protrudes through the retainer disk and is attached to an electrical terminal on a movable portion of the cover responsive to overpressure conditions in the case.

15 Claims, 5 Drawing Sheets

POLYMER-ENCASED ELECTRICAL CAPACITOR WITH PRESSURE SENSITIVE CIRCUIT INTERRUPTER

BACKGROUND OF THE INVENTION

This invention relates to pressure sensitive circuit interrupters for capacitors.

Self-healing metalized film capacitors typically function by using electrical energy to burn away small capacitor faults in their metal deposited plastic film cores. This burning process tends to clear the fault, but over time the insulating material breaks down and produces gases that gradually increase the internal pressure of the sealed capacitor case. If not alleviated, the increased pressure could eventually cause the case to rupture and leak liquid insulating material. More serious capacitor faults may cause rapid breakdown of the insulating material, in turn, causing rapid build-up of internal pressure leading to a catastrophic failure of the capacitor case. Pressure sensitive interrupters (PSI) are typically incorporated in the capacitor case to prevent rupture by rapidly breaking the internal electrical connection to the capacitor element when internal pressure exceeds a predetermined limit. Thereby, further internal pressure build-up is checked by disabling the source of the pressure.

Some pressure sensitive interrupters employ restrained metal tabs connected to "button" terminals in a manner that causes the "button" terminals to separate from the tabs when an overpressure condition occurs within the capacitor case. Other interrupters employ a nicked wire inside the capacitor case which is caused to stretch and break by an overpressure condition. One end of the nicked wire typically terminates in a solder connection to an electrical terminal which protrudes through the top of the capacitor case and is used to electrically connect the capacitor to an electrical circuit. The other end of the nicked wire is held in place inside the capacitor, usually by the capacitor core. A pressure sensitive mechanism responds to overpressure by causing the electrical terminal to move, against a metered force, away from the stationary capacitor core, thereby stretching and breaking the wire. The precise length of the nicked wire needs to be controlled to assure that the expected displacement of the electrical terminal caused by overpressure provides sufficient breaking tension on the nicked wire, while preventing nuisance breakage due to small displacements caused by external mechanical pulling on the terminal.

Nicked wire interrupter systems are typically employed in metal case capacitors where the precise length of the nicked wire can be controlled by compensating for component tolerances. One compensation method uses a groove embossed around the circumference of the metal case to hold the capacitor core a precise distance from the electrical terminal located on the case lid; a retainer disk engages the groove, and prevents the capacitor core from moving toward the cover. This allows automated assembly machines to pre-cut the wires, running between the capacitor core and the terminals, to precise length before assembly. Pre-cutting the wires is important where the electrical terminals used make it difficult to access and trim the wires after assembly (e.g., three and four sided "quick connect" terminals). A pre-cut wire cut too long will interfere with operation of the terminal, while a pre-cut wire cut too short will result in a mechanically weak solder connection, possibly leading to failure of the pressure interruption mechanism.

SUMMARY OF THE INVENTION

In general the invention features, in a first aspect, manufacturing a polymer-encased capacitor with a nicked-wire interruption system by (A) assembling the capacitor element on a supporting member (e.g., a spool); (B) installing a sliding member on the supporting member, to form an assembly, by sliding the sliding member into longitudinally-telescoping, frictional engagement with the supporting member; (C) installing the assembly in a polymer case so that one longitudinal end of the assembly rests on a surface of the case; and (D) applying a longitudinal force to the assembly to cause further sliding engagement of the supporting member and sliding member until a first predetermined longitudinal dimension between a point on the case and a point on the assembly is achieved (e.g., the amount of recess of a retainer disk below the lip of the case).

In preferred embodiments, a polymer cover is installed and ultrasonically welded to the case, while applying a longitudinal force, until a predetermined longitudinal dimension between the cover and the assembly is achieved (e.g., a gap between a retainer disk and the cover). The sliding member is press fit within the hollow core of the spool supporting the capacitor element. Wires emanating from the capacitor element are cut prior to installation of the element into the case. The polymer used for the case and cover is a thermoplastic or thermoset resin.

In a second aspect, the invention features an overpressure interruption system in which the retainer disk is spaced from the cover by a gap held to a controlled dimension. In an over-pressure condition, the retainer disk moves up against the cover, reducing the gap to zero, and prevents the capacitor element from moving further toward the cover. Under normal handling, the retainer disk can move to the extent of the gap, thus preventing a load from being placed on the breakable conductor (e.g., nicked wire) connecting the capacitor element to the external connectors.

In preferred embodiments, the nicked wire is connected by solder to the capacitor element and the solder connection is sufficiently large as not to pass through the hole in the retainer disk. This helps assure that a tension load will be placed on the nicked wire, and the wire broken, even in the event that the wire breaks loose from the capacitor element.

The invention provides a simpler and lower cost approach to manufacturing capacitors with pressure sensitive circuit interruption capability. The invention compensates for component tolerances to lower manufacturing costs and provide a reliable interrupt mechanism in polymer encased capacitors. The nicked wire solder connection and retainer disk cooperate to assure reliable interruption even where the nicked wire becomes disconnected from the capacitor core, as it sometimes does in violent failures, and allow the use of a smaller nick or non-nicked smaller gauge wire to maximize resistance to nuisance failures. The invention lends itself to parts standardization and automated assembly by machine.

Other features and advantages of the invention will be apparent from the following description of the preferred embodiment and from the claims.

DESCRIPTION OF THE PREFERRED EMBODIMENT

STRUCTURE

Figure 1:
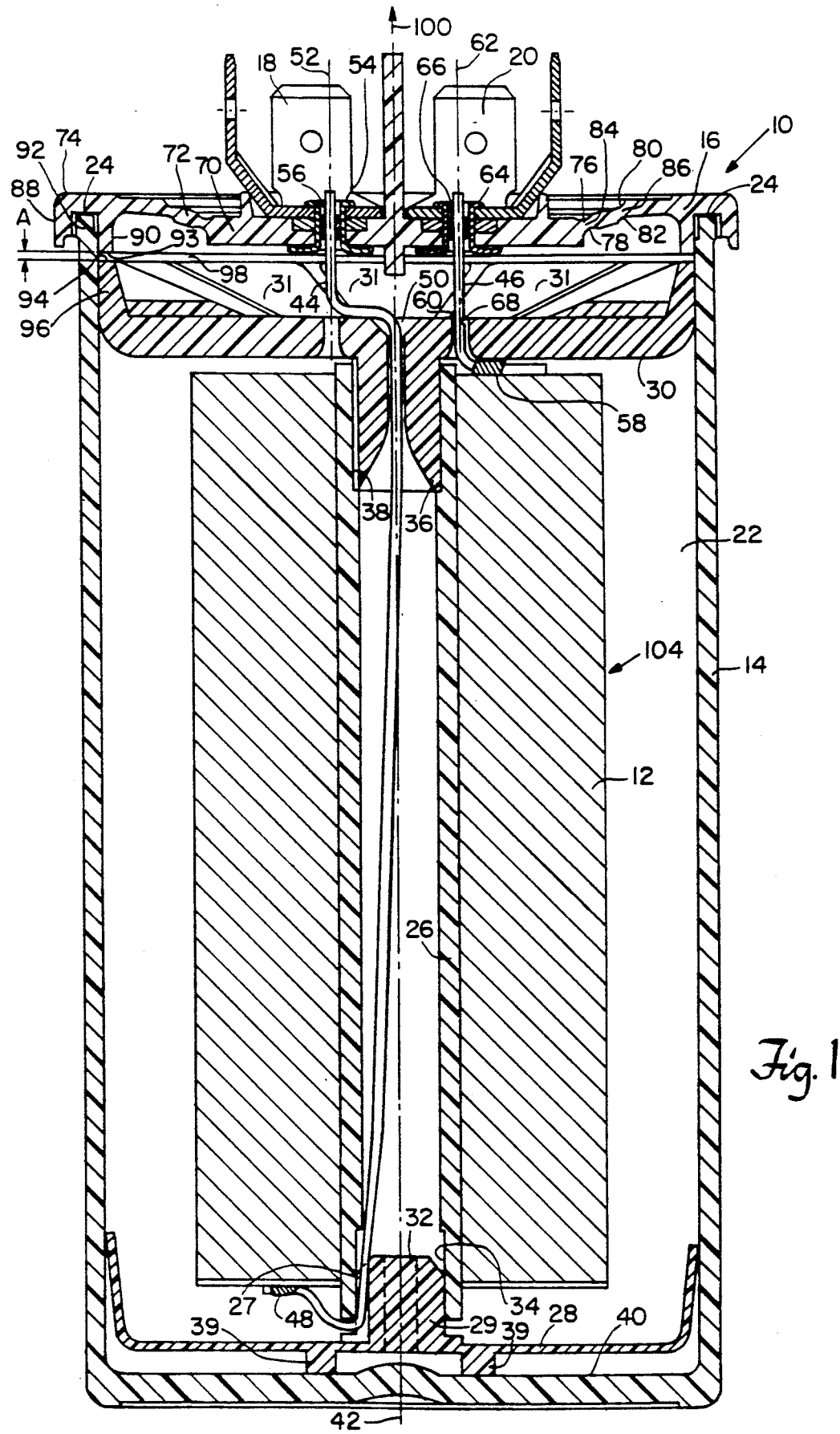
FIG. 1 is a longitudinal cross-sectional view of a preferred embodiment of the invention.

Referring to FIG. 1, a polymer encased capacitor 10 employing nicked wire circuit interruption capability and simplified automated manufacturing assembly includes a cylindrical capacitor core 12 inside a cylindrical polymer case 14 covered by a polymer cover 16 in which two electrical terminals 18 and 20 are mounted. The polymer case 14 and cover 16 are injection molded nylon, polypropylene, or another equivalent thermoplastic or thermoset resin. The interior of the case 14 is filled with an insulating oil compound 22, and the case is sealed by ultrasonically welding cover 16 to the case 14 at their mutual annular interface 24.

The capacitor core 12 is a typical metallic coated polymer wound about a central polymer spool 26. Capacitor core 12 is mounted in case 14 by means of a polymer bottom cup 28 and a polymer top retainer disk 30. A central retention member 32 is press-fit into a longitudinal counter-bore 34 in the bottom section of capacitor spool 26. Similarly, a top retainer disk retention member 36 is press-fit into a longitudinal counter-bore 38 in the top section of capacitor spool 26. Ports 31 in the top retainer disk 30 allow a pressure equalization path between the capacitor element and the cover. The combination including capacitor core 12, bottom cup 28 and top retainer disk 30 make up a capacitor core assembly 104.

Bottom cup 28 supports capacitor core 12 against the bottom 40 of case 14. Both the bottom cup 28 and the top retainer disk 30 contact the sides of case 14 around their periphery to centrally position the capacitor core 12 coaxial with the central longitudinal axis 42 of the capacitor.

Electrical contacts 18 and 20 are electrically connected to the capacitor core 12 by a long wire 44 and a short wire 46 respectively. Long wire 44 is electrically connected to the bottom of the capacitor core by means of a solder joint 48, and is routed longitudinally through the core spool 26 to pass through a central aperture 50 in the top retention disk 30. Long wire 44 is then offset from the central longitudinal axis 42 and aligned with electrical connector axis 52 and passed through solder lug 54 where it is secured by means of a solder joint 56.

Short wire 46 is electrically connected to the top of capacitor core 12 by means of a solder joint 58, and is routed through aperture 60 in the top retention disk 30, along electrical connector 20 axis 62 to solder lug 64, where it is electrically secured by a solder joint 66.

Enough tension is applied to short wire 46 before soldering to take residual slack out of the wire. Additionally, short wire 46 includes a carefully machined nick 68 which controls the amount of tension required to sever the wire 46.

Cover 16 includes a central disk portion 70, a concentric ring portion 72, and a concentric outer rim portion 74. An exterior annular grove 76 and an interior annular grove 78, together, define the interface between the central disk portion 70 and the annular ring portion 72. Similarly, an exterior annular grove 80 and an interior annular grove 82, together, define the interface between the annular ring 72 and the annular outer rim portion 74. Each of the annular grove pairs 76, 78 and 80, 82, are vertically aligned and define a flexible annular hinge region 84 and 86, respectively. When the internal pressure in the capacitor or external pulling force on central disk 70 rises sufficiently, hinge regions 84 and 86 bend to allow the central disk region 70 to axially move away from case 14 in direction 100. The degree of outward movement is dependent on the stiffness of the hinge regions, 84 and 86, and the magnitude of the applied force along direction 100.

Outer rim portion 74 defines an outer peripheral region including an outer annular flange 88 and an inner annular flange 90 which together surround a top edge region of case 14. Inner annular flange 90 has a bottom edge defining a cover annular ridge 93. Top retainer 30 has an annular flange 96 having an annular ridge 94 opposite cover annular ridge 93. An annular gap 98, having a dimension A, is formed between cover annular ridge 93 and top retainer annular ridge 94.

Figure 3:
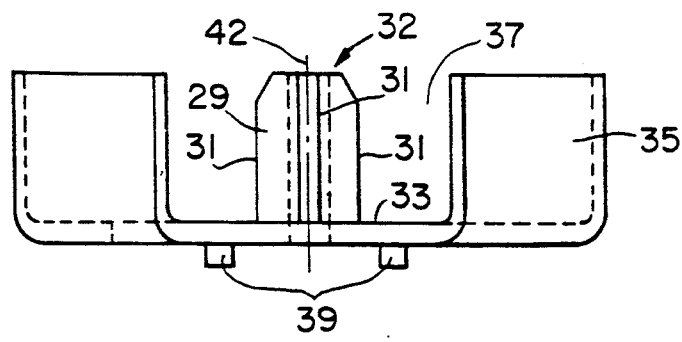
FIG. 3 is a side view of the bottom cup taken at 3—3 in FIG. 2.
Figure 2:
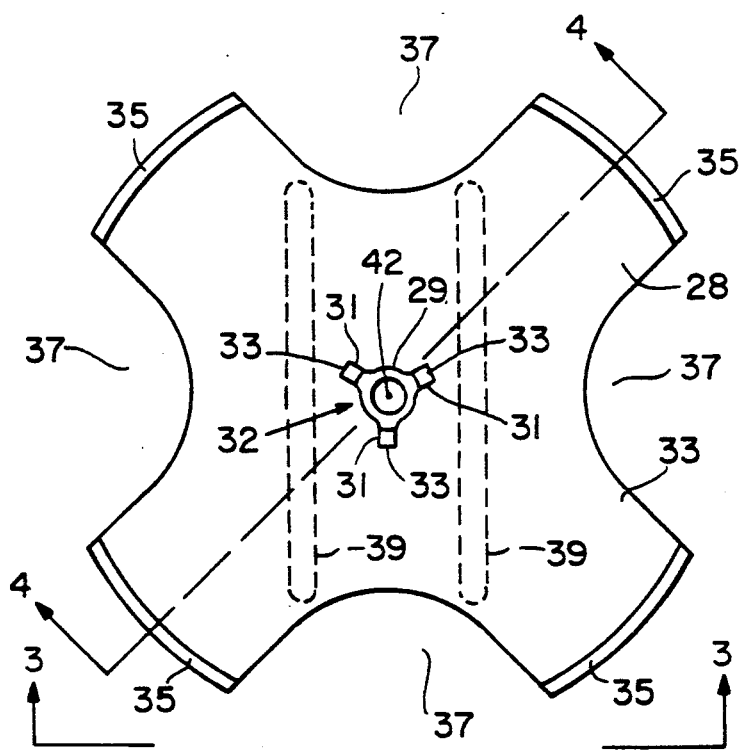
FIG. 2 is a top view of the bottom cup support for the core of the capacitor of FIG. 1.

Referring to FIGS. 2 and 3, there are shown top and side views respectively of bottom cup 28. Central retention member 32 is centered on and extends along longitudinal axis 42, which is normal to the plane of bottom cup surface 33. Three contact members 31 are equipositioned around, and extend perpendicularly from, a central cylindrical member 29 coaxial with longitudinal axis 42. Each contact member 31 has a substantially flat contact surface 33 which contacts counter-bore 34 (FIG. 1) when the central retention member is press-fit into capacitor element spool 26. An opening 27 is formed between cylindrical member 29 and the capacitor element spool to provide a space for long wire 44 to pass into the spool when bottom cup 28 is in place (FIG. 1). Additionally, the use of flat contact surfaces enhances the precision with which these surfaces are molded during manufacture by increasing the ability of plastic resins to flow into the area of the surfaces during the molding operation while maintaining efficient molding cycle times. The enhanced precision in molding these surfaces in turn increases the holding performance of the overall part by providing a substantial contact surface area between the central retention member and the capacitor spool.

Four segmented annular sections 35 form the sides of bottom cup 28. Cutouts 37 in the side and bottom portions of the bottom cup provide ports for the flow of insulating material through the bottom cup when the capacitor core assembly 104 (FIG. 6) is being placed into the case 14, filled with insulating material, during manufacture of the capacitor, as discussed below.

Two bottom cup feet 39 extend below the bottom cup and traverse the bottom cup substantially parallel to one another on either side of the central retention member. The bottom cup feet contact case bottom 40 (FIG. 1) to support capacitor core assembly 104 inside case 14.

Figure 4:
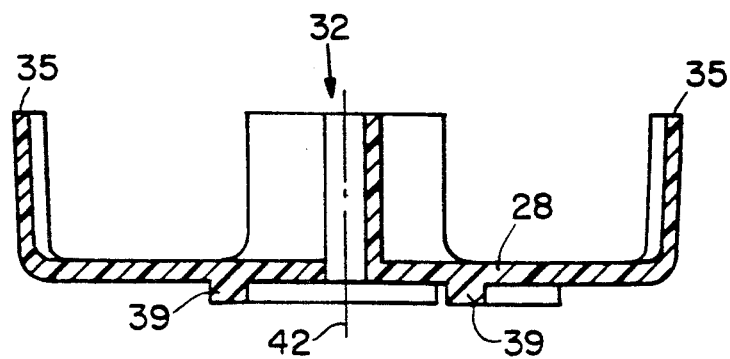
FIG. 4 is a cross-sectional side view of the bottom cup taken at 4—4 in FIG. 2.

Referring also now to FIG. 4, there is shown a cross-sectional view of bottom cup 28, in particular, side portions 35. Side portions 35 are slightly flared outwardly from the central axis 42 so they resiliently contact the sides of case 14 during insertion into the case, thereby preventing rotation of core assembly 104 as it is slid into place. The contact force, however, is insufficient to inhibit the core assembly 104 from sliding toward cover 16 in response to tension on wire 46 as discussed below.

OPERATION

Figure 5:
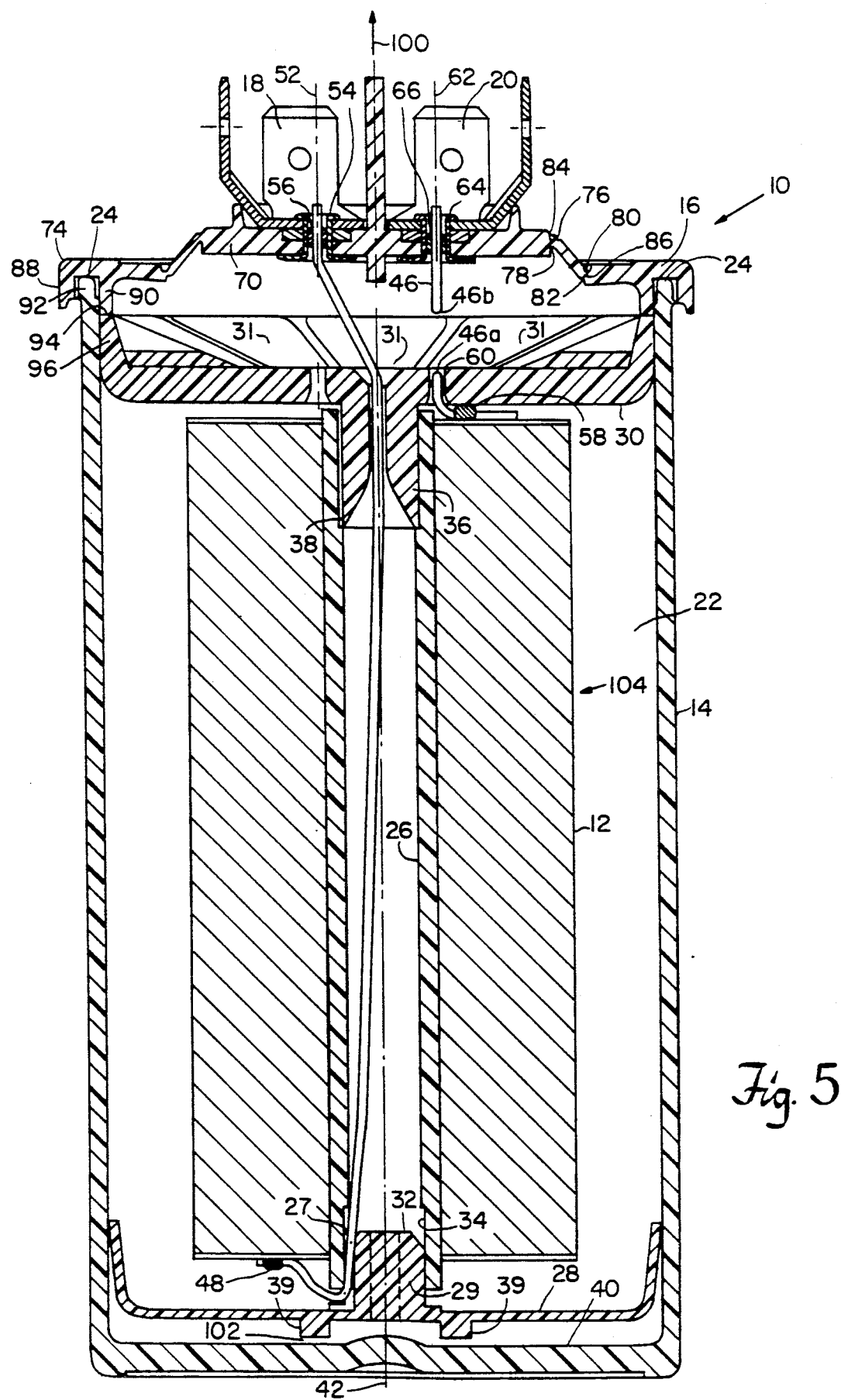
FIG. 5 is a longitudinal cross-sectional view of the capacitor of FIG. 1 with the cover deformed into a convex position, in which the capacitor is disconnected.

Referring to FIG. 5, when the internal pressure inside case 14 increases, or an external pulling force is applied to the electrical terminals 18, 20, an outward force is exerted on central disk 70 in the direction of arrow 100. The outwardly moving central disk 70 applies tension to short wire 46, in turn, causing capacitor core assembly 104 to move axially toward cover 16, pulling along with it top retainer 30. Eventually, top retainer annular ridge 94 contacts cover annular ridge 93 closing annular gap 98 (FIG. (1), and creating a gap 102 between the bottom cup feet 39 and case bottom 40. Until annular gap 98 has been closed, the only tension developed on short wire 46 is that required to slide capacitor core assembly 104 toward the cover in the direction of arrow 100, which is insufficient to break wire 46. Therefore, the amount of force applied to the central disk 70 along direction 100, whether generated by internal pressure or external pulling, before annular gap 98 is closed, will be insufficient to break wire 46.

The nuisance breakage of wire 46 caused, for instance, by pulling on capacitor electrical terminals 18 or 20 can be controlled by adjusting the size of the annular gap 98 during manufacturing to prevent the gap from closing until a predetermined deflection of central disk 70 occurs. For instance, to withstand a 50 pound pull test on the central disk 70, the annular gap need only be large enough to compensate for the distance that a 50 pound pull would cause central disk 70 to move along direction 100. By doubling the gap size, a 100 pound pull would be tolerated assuming a roughly linear relationship of central disk 70 deflection versus applied force over the range of 50 to 100 pounds. Central disk 70 moves back to its initial position when tension is released, thereby creating a benign slack in wire 46.

When internal pressure becomes large enough, central disk 70 is caused to pop outward toward an extended position as shown in FIG. 5. As the central disk 70 rises under pressure it reaches a point in its travel where it rapidly pops up toward the extended position, thereby aiding rapid and complete disconnect of wire 46.

As central disk 70 moves toward the extended position, tension on short wire 46 causes annular gap 98 to close, at which point any further outward movement of central disk 70 will increase the tension on the wire and cause it to break into two pieces 46a and 46b at nick 68 (FIG. 1). Top retainer 30 is of sufficient stiffness to prevent bending of the retainer toward the cover 16 caused by the increased tension on wire 46. Additionally, solder joint 58 is large enough to prevent wire 46 from slipping through top retainer aperture 60 if wire 46 should become disconnected from capacitor core 12. If such slipping were to occur, wire 46 may not break, and may possibly stay in electrical contact with core 12 even after central disk 70 reaches its fully extended position. This could possibly result in failure of the pressure sensitive interruption mechanism, and thereby allow the capacitor case to rupture.

Breaking wire 46 into pieces 46a and 46b in response to an internal buildup of pressure causes a halt to the flow of electric current through capacitor core 12, which in turn halts the generation of gasses which increase the internal pressure. In this manner rupture of case 14 is prevented.

Several mechanisms prevent wire segment 46b from reestablishing contact with wire segment 46a or the capacitor core itself. First, the extended position of central disk 70 will be maintained as long as the internal pressure within the capacitor case is maintained. The polymer case and ultrasonically attached polymer cover provide an excellent leakproof system for maintaining the internal pressure after interruption occurs. For instance, heat produced from an electrical fault within the capacitor causes the capacitor elements to expand, including capacitor core 12, insulating material 22 and polymer case 14, while the internal pressure builds sufficiently to cause central disk 70 to move to its extended position and interrupt current flow to the capacitor. Once the current flow is interrupted, the capacitor elements cool and contract, potentially reducing the internal pressure in the case. However, the polymer case also contracts as it cools, thereby maintaining the internal pressure of the capacitor after current flow is interrupted.

Secondly, nick 68 (FIG. 1) in wire 46 is machined so as to prevent work hardening of the metal surrounding the nick. Just prior to interruption the tension on the wire tends to elongate the area of the nick first, reducing its current carrying capability and causing it to vaporize under the current load of the capacitor fault. This typically produces two separated wire segments 46a, 46b (FIG. 5) having an overall length less than that of wire 46 prior to interruption. Thus, even if central disk 70 were to move back to its original pre-interruption position, wire pieces 46a, 46b would not be long enough to contact each other.

Thirdly, top retainer 30 insulates wire segment 46b from the top of core 12 to prevent contact after interruption, and also provides protection to wire segment 46a. Nick 68 is located within top retainer aperture 60 (FIG. 1) so that wire segment 46a remains below the surface of the top retainer after interruption (FIG. 5). The small size of aperture 60 makes it improbable that 46b will exactly align with and enter the aperture to reestablish contact with wire segment 46a. All three mechanisms taken together result in an insignificant chance of capacitor failure by reconnection of the wire segments after interruption.

ASSEMBLY

It is clear from the previous discussion that reliable and repeatable disconnect operation of wire 46 and prevention of nuisance failures is to a large extent dependent on controlling, i.e., the size of annular gap 98 gap dimension A (FIG. 1). Many tolerances that figure into the setting of gap dimension A are not easily controlled at the individual component level. For instance, it is expensive and difficult to control the length of capacitor core 12, the height of case 14, or the thickness of cover 16 within tolerances necessary to set gap 98 reliably. However, the construction of this capacitor coupled with automated manufacturing techniques eliminate the need for tight tolerances on the parts themselves, yet provide an easy means for setting the gap dimension A, and thereby the disconnect parameters of the capacitor.

Figure 6:
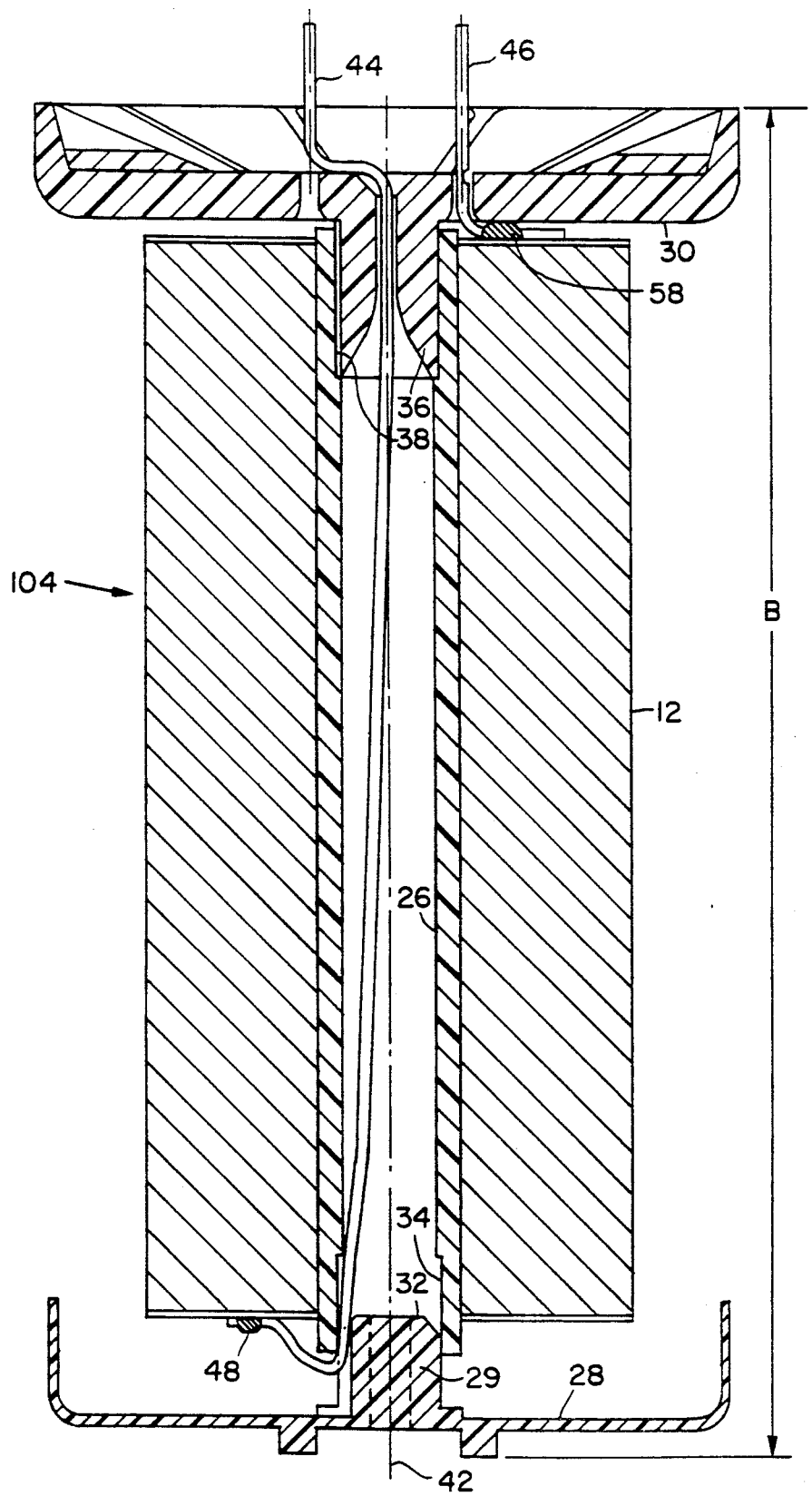
FIG. 6 is a longitudinal cross-sectional view of the central core assembly of the capacitor of FIG. 1.

Referring to FIG. 6, a first stage capacitor core assembly 104 created by the automated assembly process is shown. Long wire 44 and short wire 46 are electrically connected to capacitor core 12 by solder joints 48 and 58 respectively. Top retainer 30 is threaded over wires 44 and 46, and press-fit into longitudinal counter-bore 38 until central retention member 36 extends the full length of counter-bore 38 or until top retainer 30 contacts solder joint 58. Bottom cup 28 is press-fit into counter-bore 34 with bottom cup retention member 32 extending only far enough into counter-bore 34 to set dimension B. This assembly is easily accomplished by a machine that press-fits bottom cup 28 into counter-bore 34 until dimension B is attained. This process creates a central core assembly with a known long dimension B, thus compensating for potentially large tolerances such as the length of capacitor core 12 and size variations of top retainer 30 and bottom cup 28.

Since the distance from the top retainer disk 30 to the cover 16 is known and well controlled during the manufacturing process, as discussed below, long wire 44 and short wire 46 may be formed and cut to their final length as part of the capacitor core assembly process of FIG. 6. This eliminates the often difficult task of trimming these hard to reach wires after capacitor assembly, especially where three or four sided electrical terminals are used.

Figure 7:
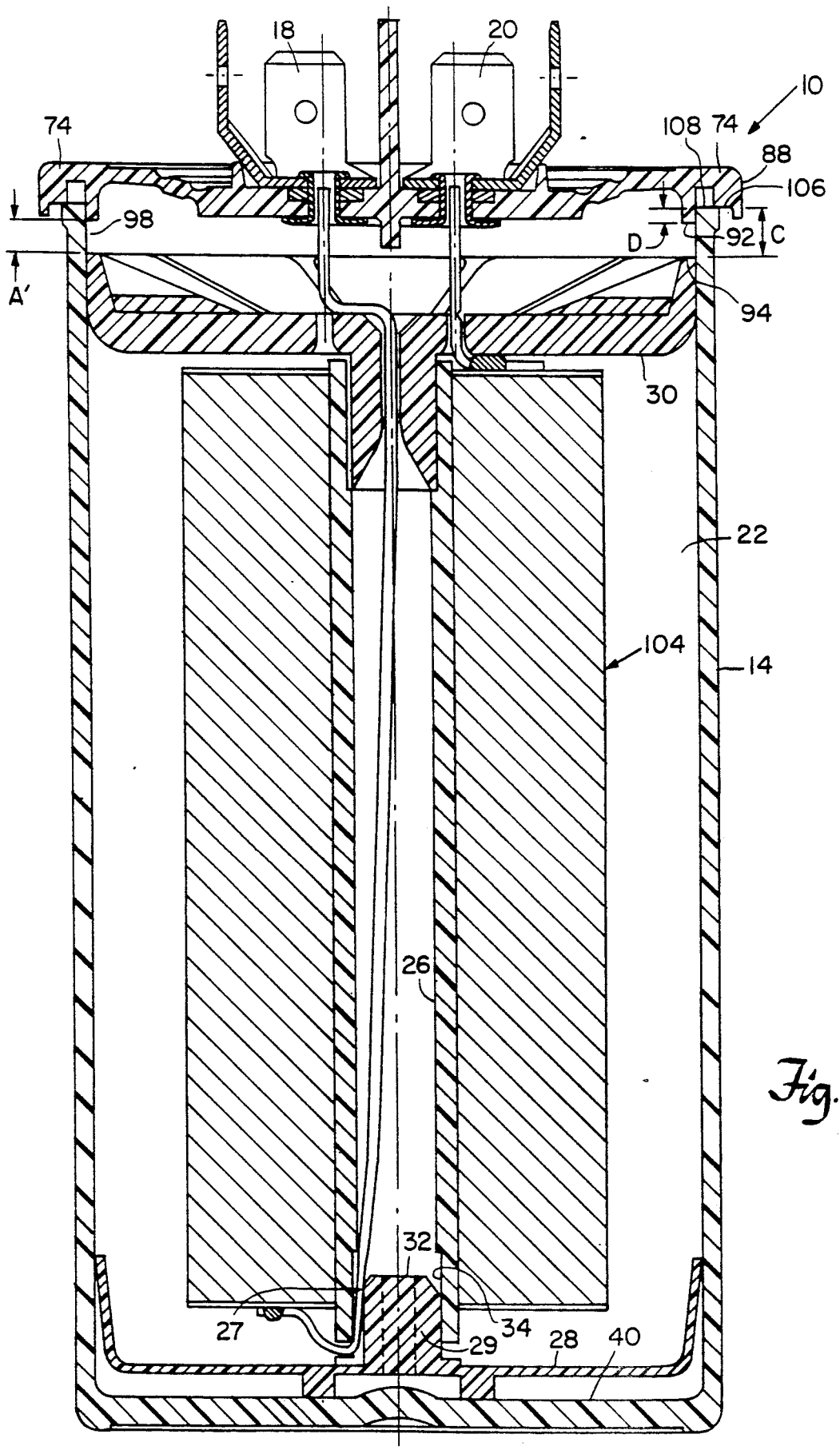
FIG. 7 is a longitudinal cross-sectional view of the capacitor of FIG. 1 before the cover is ultrasonically welded to the case.

Referring to FIG. 7, the capacitor core assembly 104 is inserted into the case 14, previously filled with insulating material, until bottom cup 28 contacts case bottom 40. Mechanical force is applied, by a machine, to top retainer 30 to push capacitor core 12 and spool 26 further onto bottom cup retention member 32 to precisely set dimension C, the distance from the top edge 108 of case 14 to the top retainer annular ridge 94. This compensates for the potentially large tolerance in the height of case 14.

Top cover 16 is shown in place before ultrasonic welding. Top cover outer flange 88 has an outer annular ridge 106 shown supporting the cover 16 on the top edge 108 of container 14. Dimension D, the distance from outer flange annular ridge 106 to inner flange annular ridge 92 is well controlled in the manufacturing of cover 16. Dimension A', the size of annular gap 98 before ultrasonic welding, can be precisely determined from dimensions C and D, and depends only on these two well controlled dimensions. Annular gap 98 prevents ultrasonic energy, applied to the cover outer rim portion 74 to create an ultrasonic weld at interface 24, from being coupled through top retainer 30 into capacitor core 12. Thus, annular gap 98 prevents heating the internal capacitor parts, and makes for a more efficient welding operation by reducing the total ultrasonic energy applied to the part for producing a reliable, uniform ultrasonic weld. Therefore, an ultrasonic welder need only apply enough ultrasonic energy to cover outer rim portion 74 to cause cover 16 to move a distance sufficient to close gap 98 to the desired final gap dimension A (FIG. 1).

Other embodiments are within the following claims.

What is claimed is:

1. A method of manufacturing a polymer encased capacitor with a nicked wire interruption system, said method comprising the steps of:
    (A) assembling a capacitor element on a supporting polymer member;
    (B) installing a base on said supporting polymer member, by sliding said base into longitudinally-telescoping, frictional engagement with said supporting member;
    (C) installing a retainer disk on said polymer member at the end opposite said base;
    (D) installing the assembled polymer member, base, and retainer disk through an opening in a polymer case so that said base rests on a surface of said polymer case; and
    (E) applying a longitudinal force to the retainer disk to cause further sliding engagement of sad supporting member, base, and retainer disk until a first predetermined longitudinal dimension between a point on said case and a point on said retainer disk is achieved;
    (F) installing a polymer cover to said polymer case over the opening in said case;
    (G) ultrasonically welding said polymer cover to said case, while applying a longitudinal force, until a second predetermined longitudinal dimension between said polymer cover and said retainer disk is achieved.

2. The method of claim 1 wherein said welding and application of force is continued until, as the result of the welding, said cover moves longitudinally relative to said case by a third predetermined longitudinal dimension.

3. The method of claim 1 wherein said supporting member is a hollow core around which said capacitor element is wound and said base and retainer disk each form an interference fit with said hollow core.

4. The method of claim 1 further comprising, prior to installing said cover, the step of cutting one or more wires emanating from said capacitor element so that their ends are spaced longitudinally from said retainer disk or case by a predetermined longitudinal dimension.

5. The method of claim 4 wherein said cutting step is performed before installing said capacitor element in said case.

6. The method of claim 1 wherein said polymer case is constructed of a thermoplastic or thermoset resin.

7. An electrical capacitor comprising:
    a polymer case with polymer walls,
    a polymer cover connected to and sealing one end of said polymer case, said polymer cover having a movable region that moves outwardly in a longitudinal direction in response to an overpressure condition within said polymer case;
    a capacitor element disposed in said case, said capacitor element immersed in a liquid insulating material;
    one or more electrical connectors mounted on said movable region of said polymer cover;
    a retainer disk connected to an end of said capacitor element closest to said cover, said retainer disk spaced longitudinally from said cover by a predetermined gap, said retainer disk, polymer case, capacitor element, and cover being shaped and configured so that said capacitor element can move longitudinally toward said cover unimpeded by said polymer case until said gap is reduced to zero and is thereafter prevented from further such movement by contact with said cover; and
    one or more electrical conductors connecting said capacitor element to said electrical connectors, said conductors extending through holes in said retainer disk.

8. The electrical capacitor of claim 7 wherein said conductors include a nicked wire with a nick configured to break when sufficient internal pressure develops to reduce said gap to zero and move said movable region of said cover outwardly.

9. The electrical capacitor of claim 8 wherein said nicked wire is connected to the end of said capacitor element closest said cover.

10. The electrical capacitor of claim 7 wherein said nicked wire is connected by a solder connection to said capacitor element and the solder connection is sufficiently large as not to pass through a said hole in said retainer disk through which said nicked wire passes.

11. The electrical capacitor of claim 7 wherein
said capacitor element comprises a polymer spool on which said capacitor element is wound, said spool having a hollow core;
said retainer disk further comprises a first retention member extending from said disk for engaging one end of said hollow core of said spool; and
wherein said first retention member is press fit into one end of said spool.

12. The electrical capacitor of claim 11 further comprising a bottom cup having a second retention member extending from said bottom cup for engaging one end of said hollow core of said spool, wherein said second retention member is press fit into another end of said spool.

13. The electrical capacitor of claim 12 wherein said retainer disk and said bottom cup slidably engage said hollow core of said case.

14. The electrical capacitor of claim 7 wherein said retainer disk withstands bending forces when said gap is reduced to zero.

15. The electrical capacitor of claim 7 wherein said polymer case is constructed of a thermoplastic or thermoset resin.

* * * * *